United States Patent [19]
Mustafa

[11] Patent Number: 6,162,349
[45] Date of Patent: Dec. 19, 2000

[54] METHOD FOR PACKAGE PARTITIONING WALL TESTING

[75] Inventor: Ramon Armando Mejia Mustafa, Hillsborough, N.J.

[73] Assignee: Colgate-Palmolive Company, New York, N.Y.

[21] Appl. No.: 09/122,318

[22] Filed: Jul. 24, 1998

[51] Int. Cl.[7] .................................................. G01N 27/26
[52] U.S. Cl. ...................... 205/791.5; 204/400; 205/775; 206/277; 206/527
[58] Field of Search .................................... 204/400, 401, 204/404; 205/775.5, 791.5, 775

[56] References Cited

U.S. PATENT DOCUMENTS

| | | | |
|---|---|---|---|
| 2,643,223 | 6/1953 | Notvest | 204/400 |
| 3,710,616 | 1/1973 | Smith et al. | 205/791.5 |
| 5,050,426 | 9/1991 | Torres-Ibanez . | |

FOREIGN PATENT DOCUMENTS

| | | |
|---|---|---|
| 2 362 051 | 3/1978 | France . |
| 58-111749 | 2/1983 | Japan . |
| 1589751 | 8/1976 | United Kingdom . |
| 1589751 | 5/1981 | United Kingdom . |
| WO 95/09351 | 4/1995 | WIPO . |
| WO95/09351 | 4/1995 | WIPO . |

OTHER PUBLICATIONS

Bogardus et al, IBM Technical Disclosure Bulletin, vol. 20, No. 1, Jun., 1977, pp. 432–433.

*Primary Examiner*—T. Tung
*Attorney, Agent, or Firm*—Michael McGreal

[57] ABSTRACT

The integrity of the dividing partitions walls of a multi-chamber container can be tested for voids after the filling of the containers. This is particularly useful for multichamber tube containers. These containers can have relatively thin tube divider partitioning walls which can have voids in the partitioning, in the attachment of the partitioning to the container walls, or in the case of a tube container the attachment of the dividing partition wall to the shoulder. The container chambers are filled with the substances which also are electrolytes and at the time of filling or just subsequent to filling, a potential difference is applied to each of chambers. Since the substance in each chamber is an electrolyte the potential difference extends throughout each side of the barrier. If there are one or more voids in dividing partition, there will be decrease in the potential difference. This can be detected on a meter or the potential difference can operate a switch that directs containers that have been found to have voids to a reject chute.

20 Claims, 2 Drawing Sheets

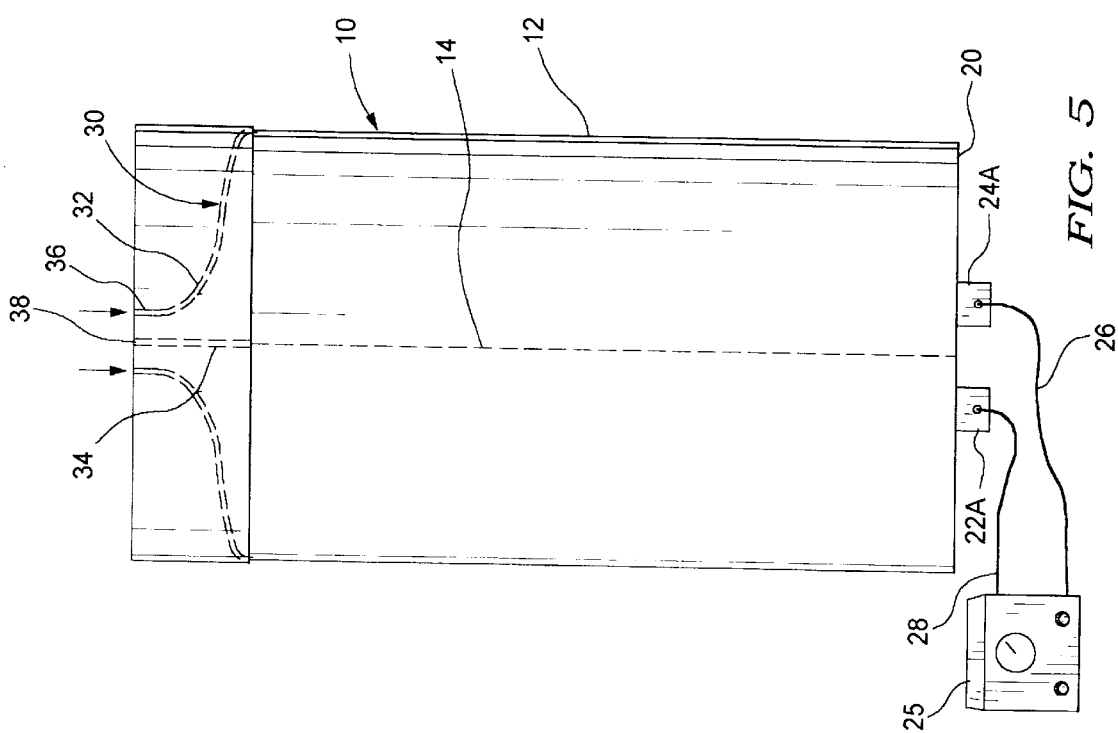

METHOD FOR PACKAGE PARTITIONING WALL TESTING

FIELD OF THE INVENTION

This invention relates to a method and apparatus for the testing of internal barrier walls of a package for voids. More particularly, this invention relates to a method and apparatus for the testing of an internal barrier wall of a multichamber tube package for voids.

BACKGROUND OF THE INVENTION

Various packaging is produced with two or more chambers. This includes bottles, syringes, dispensing pumps and tubes. In most applications it is important that the components of the chambers not come into contact until the components are dispensed from the package. This is the case since in many instances the components are reactive. Consequently, the separating walls in the package must be of a high integrity. There cannot be any voids in the wall material. This then presents the problem with regard to determining if there are any voids in the walls of a finished package. This can be accomplished at an early stage in the manufacture of the packages. However, many defects in the divider walls can be caused during package making or filling. Consequently, it is preferred to test the integrity of the package after filling. It has been found that when the substances to be filled into the container are electrolytes, the integrity of the barrier wall can be tested after filling the container using the packaged substances in the testing process. The packaged substances are used as an electrolyte to provide a charge along the barrier walls.

It has been found that the divider barrier walls of packages, and in particular tube packages, conveniently can be tested as to integrity by electric potential testing techniques after the packages have been filled. A voltage potential is placed on an electrode in the substance on one side of the wall versus an electrode in the substance on an other side of the wall. The potential difference is adjusted so that the barrier divider wall material insulates the electrodes, one from the other. However, if there is a void in the wall, there is a leak of current through the barrier void with a change in potential difference. This change in potential difference then can be measured and noted to reject the container with this void containing interior wall. This is a very effective technique for the testing of multichamber tubes, and in particular, dual chamber tubes even though they are tested in a filled condition. This is the case since the test technique can be incorporated into the process of filling the tubes. That is, the barrier divider walls can be tested for voids after the filling of the tube body. Since this is the last processing step prior to the sealing and final cartoning of the tubes the test is conducted a time where any defects that are caused by handling and filling the tube can be discovered. This is a preferred time to test the tubes for defects.

BRIEF SUMMARY OF THE INVENTION

This invention is directed to the testing of the inner divider walls of packages for voids, and in particular, at the time that the package is being filled or just after the packages have been filled. The voids can be from defects in the film material of the barrier divider wall, or voids in the attachment of the divider wall to the shoulder wall of a tube, or voids in the region of the attachment of the barrier divider walls to the outer wall. These latter voids are created at the time of the attachment of the divider walls to the outer wall. Voids also can be caused during package handling before filling and during the filling process. This testing for voids is accomplished after filling by having an electrode in each contained substance on each side of one of the divider walls and applying a potential difference between the two electrodes. If there is a void, there will be a change in the potential difference. There will be a passage of the current through both direct and circuitous voids. A direct void is one that has an essentially straight path through a wall. A circuitous void is one that does not have an essentially straight path through a wall but a more random path. This testing for both direct and circuitous voids is advantageous since components of a composition could traverse both direct and circuitous voids. This is particularly the case when it is considered that the components can be stored in the package for from several months to several years.

This void testing technique is particularly useful when integrated into the tube filling process. This is the final processing step before the tube is sealed. In most instances the tubes will be bottom filled. In this filling operation the closure placed on the dispensing each of the tube and the tube is inverted. The inverted tube is conveyed to the filler and is filled simultaneously with the two different products. A filler nozzle enters each chamber and pumps a given weight or volume of each substance into each chamber. Usually the filler nozzle will be extracted from the tube chambers during the filling operation and maintained immediately above the level of the substances as the tubes are being filled. Once filled the bottom edge is pressed together and crimp sealed.

Multichamber tubes also can be top filled. However, in this instance a larger than usual top opening may be needed to accommodate the filling nozzles. In this embodiment the tube can be of a bottle type since there need not be a bottom crimp seal. The bottom can be continuous with the sidewalls. In this type of tube the filler nozzles enter through the top opening and fill the chamber of the tube in the same manner as the bottom filled tubes. After filling a closure is placed on the top opening to fully seal the tube.

In the testing of the integrity of the chamber divider walls in the present invention a potential is applied across the divider wall. This is accomplished by the use of the substance in each chamber as an electrolyte. This is very applicable in the embodiment when the substance in each chamber is a dentifrice. An electrode is placed into the substance in each chamber and a potential difference applied to these electrodes. If there is a void, there will be a short circuit through the void and a decrease in the potential difference.

The electrode can be a separate electrode that is inserted into each chamber after filling, can be an extension onto each filling nozzle, or can be constituted by the filling nozzle itself. In the latter two embodiments the parts constituting the electrodes would have to be insulated from other parts of the filling equipment. The arrangement of the electrodes would be dictated by the type of filling equipment and the filling process.

In this process the potential difference applied to the electrodes can be from about 0.5 volts or less to 10,000 volts or more. The electrolytic strength of the substances in the chambers will determine the potential difference. For dentifrices the potential difference can very effectively be in the range of about 1 volt to about 110 volts. A preferred range is about 5 volts to about 12 volts. This is the case since dentifrices contain water and various calcium, sodium, fluoride and fluoride phosphorous salts. These components form good electrolytes.

It is advantageous to test the integrity of the tube divider walls after filling since this is subsequent to any time that the barrier divider walls could be damaged. This is subsequent to the filler nozzles entering and filling the chambers. After this operation, the only processing that could damage the barrier divider walls and create any voids in the barrier divider walls is the crimp sealing of the tube when the tube is bottom filled.

BRIEF DESCRIPTION OF THE DRAWINGS

FIG. 5 is an elevational view of electrodes insulated from the filler.

DETAILED DESCRIPTION OF THE DRAWINGS

The invention will now be described in detail with reference to the drawings. There are shown several embodiments for the testing of the integrity of the partitioning wall of a multichamber tube container. The partitioning walls divide the tube into a number of chambers. The invention will be described with reference to the preferred embodiment where the tube contains two chambers and there is a single partitioning wall.

Figure 1:
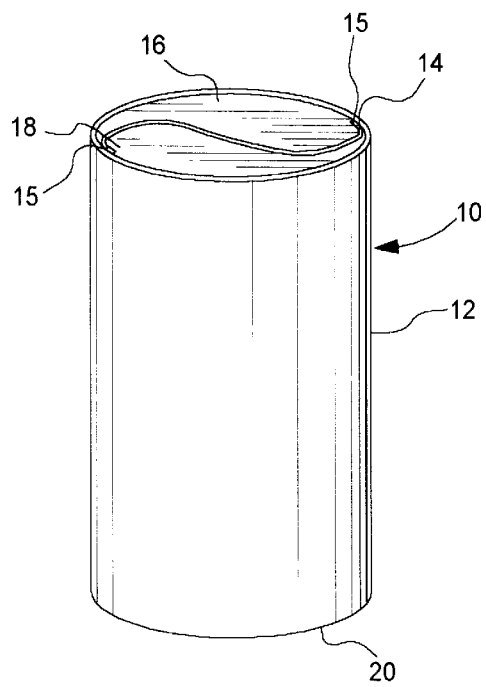
FIG. 1 is an elevational view of a tube being bottom filled.

In FIG. 1 there is shown a tube being bottom filled. The tube 10 has a sidewall 12 and a dividing partition wall 14 which divides the tube into chambers 15 and 18. Filler nozzle 17 is inserted into chamber 15 and filler nozzle 16 is inserted into chamber 18. A closure 19 closes and seals the other end. At this closure end, the tube will have a shoulder and nozzle which are not shown.

Figure 2:
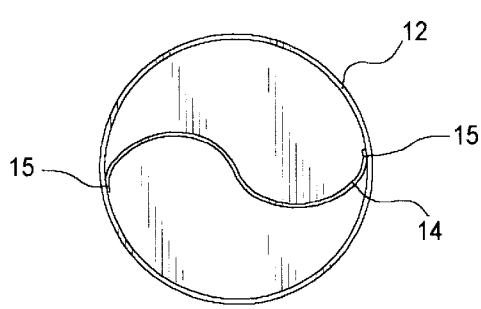
FIG. 2 is an elevational view of a tube being top filled.

In FIG. 2 there is shown a tube being top filled. There is shown a tube 20 with sidewall 22. The tube terminates at one end in a continuous area 23 and at the other end in wide opening 21. This opening 21 is sufficiently wide to accommodate filler nozzle 26 and filler nozzle 27. The divider wall is depicted by dotted line 31.

Once the filler nozzles are inserted into the tube a given weight or volume of substance will be flowed into each chamber. The nozzles are moved upwardly out of each chamber of the tubes as the tubes are filled. In the embodiment of FIG. 1 after filling the bottom of the tube is sealed by crimp sealing after placing two opposite parts of the sidewall into contact. In the embodiment of FIG. 2 a cap closure is placed over the top of the tube to reduce the opening to a smaller size and to provide an air and moisture tight seal. The tubes then can be placed in cartons for subsequent sale. The bottom filled tube of FIG. 1 will be tested for any voids in the divider wall prior to sealing the bottom of the tube. The top filled tube of FIG. 2 will be tested for voids in the divider wall prior to placing the cap closure over the top opening.

Figure 3:
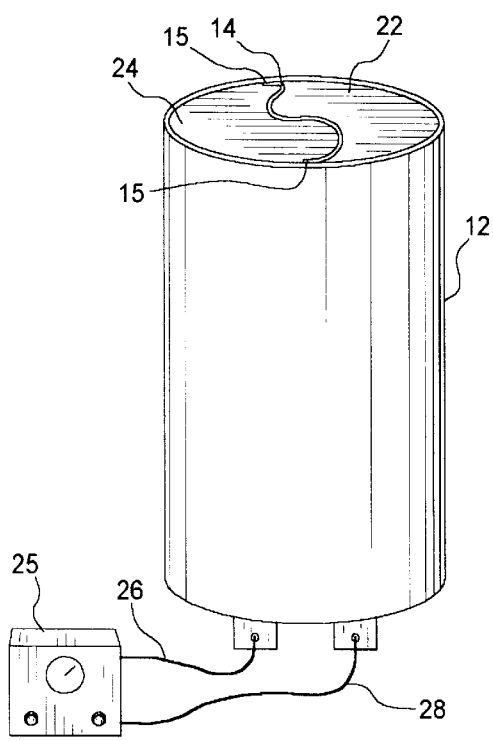
FIG. 3 is an elevational view with electrodes on the substances in each chamber.

FIG. 3 discloses a first embodiment for the testing of the dividing and partitioning wall, and its attachment to the sidewall and shoulder for voids. This is shown for the embodiment of FIG. 1. A first electrode 30 is placed into contact with the substance in a first chamber and a second electrode 32 is placed into contact with the substance in a second chamber. Lines 29 connect each electrode to a source of potential difference. A potential difference then is applied to these electrodes. If there are one or more voids, it will be evident on meter 25(a) which will show a change in the potential difference of the electrodes. Besides being on a read-out meter, this change in potential difference can be set to activate an audible or visual signal or it can activate a switch so that the tube on a filling line will be directed to and slide down a reject chute. This testing usually will be done in the tube filling line at a station after the filling station.

Figure 4:
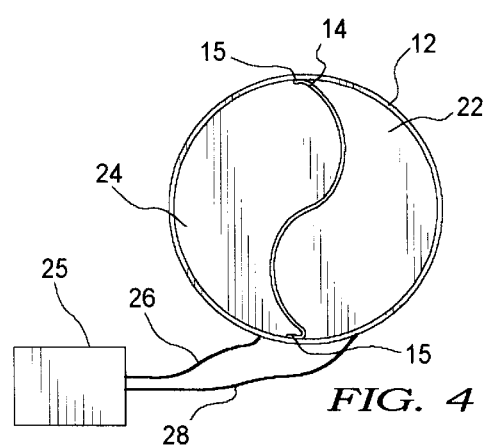
FIG. 4 is an elevational view of filler nozzles with an attached electrode.

FIG. 4 discloses a pair of nozzles where the test electrode is a part of each nozzle. Electrode 36 is shown as a part of nozzle 17 and electrode 34 is shown as a part of nozzle 16. The depth of the electrodes into cream can be as low as 5 mm. However, due to filling height variances, 100 mm is preferred. Insulators 33 can be used to insulate the electrodes from the remainder of the nozzles. Leads 35 convey a potential difference to electrodes 34 and 36.

FIG. 5 shows the embodiment where the nozzles also function as the electrodes. Nozzles 16 and 17 also function as the electrodes. These nozzles are insulated from the remainder of the filler by insulators 37 and 39. In addition, since the formulations conduct a current, the storage tanks for each product component and its associated conduits to the filler nozzle must be isolated, one from the other. Although it is possible in many embodiments to use the electrode arrangements of FIG. 4 and FIG. 5, the preferred embodiment is the test device and method of FIG. 3. It will be a more accurate to test for partitioning wall voids on a high speed filling line.

A requirement in the use of this void testing technique of partitioning walls is that the substances in each chamber be electrolytic. That is, it must also function as an electrolyte. Most substances that are packaged into tubes are electrolytes. This is particularly the case for dentifrices which are comprised primarily of water, fluoride salts, phosphate salts, sodium ions and calcium ions along with inorganic polishing agent. Dentifrices clearly are electrolytic substances. Many creams and lotions, likewise, are electrolytic with dual chamber tubes tested in the same manner.

The voltage that is applied to the electrodes ranges from about 0.05 volts DC or less to about 10,000 volts DC or more. Lower voltages are preferred since they will require fewer safety measures and will present little or no deleterious affect to the substances within each chamber. A preferred voltage is about 1 volt to about 100 volts, and most preferably about 5 volts to 12 volts.

As noted, the divider wall testing will be conducted at the product filler station or just subsequent to the product filler station. Each embodiment has advantages and disadvantages. However, each technique has the advantage that the divider wall is tested as a last possible step prior to tube sealing and cartoning. If the testing is done at the filler, it will be necessary to electrically isolate the parts of the filler that provide the potential difference. If the testing is done subsequent to the filler, an additional station is needed. However, this can be accommodated in a rotary table filler since the testing will not require any more time than the filling of the tubes. After filling, the tubes in the same orientation can move to the testing station where electrodes are inserted into the substance in each filled chamber. If the potential difference is not within the set range, the tube is rejected. If within, it is approved. The electrodes then are quickly raised out of the tube.

Various modifications of this testing technique can be made. However, such modifications are within the present concept of testing the integrity of the divider wall of multichamber containers after filling by using the contained substances as the electrolyte and measuring the potential difference between the chambers.

What is claimed is:

1. A method to determine the integrity of a package barrier wall comprising:

a package open at a first end and having at least one elongated outer wall and at least one inner partitioning wall to form at least two separate chambers;

filling at least one component of a product into a first chamber with a first filler nozzle and at least a second component of said product into a second chamber with a second filler nozzle, said first filler nozzle having a first electrode as a part thereof and said second filler nozzle having a second electrode as a part thereof, each component of said product being an electrolyte;

applying an electrical potential difference between said first electrode and said second electrode while maintaining said first electrode in said one component in said first chamber and said second electrode in said second component in said second chamber; and measuring said potential difference and comparing said potential difference to a standard to thereby determine if there are any voids extending substantially through said at least one inner partitioning wall.

2. A method as in claim 1 wherein said package is a tube, said first electrode and said second electrode are extended respectively into said one component and said second component after said one product component has been filled into said first chamber and said second product component has been filled into said second chamber.

3. A method as in claim 2 wherein there is relative motion between said package and said electrodes for extending said electrodes into said one component and said second component.

4. A method as in claim 1 wherein said at least one inner partitioning wall has a thickness of about 10 microns to about 500 microns.

5. A method as in claim 4 wherein the electrical potential difference between said first and second electrodes is about 0.5 volts to about 5000 volts.

6. A method as in claim 1 wherein said at least one inner partitioning wall is comprised of one of a polyolefin polymer or copolymer.

7. A method as in claim 1 wherein said at least one inner partitioning wall is comprised as a multilayer structure, at least one layer being a polyolefin.

8. A method as in claim 1 wherein said at least one inner partitioning wall is comprised of a polyethylene terephthalate.

9. A method as in claim 1 wherein each of said product component substances is a dentifrice.

10. A method as in claim 1 wherein each of said one component and said second component is a solution containing inorganic ions or organic polar ions.

11. A method as in claim 1 wherein said first electrode is a filler nozzle that extends into a first chamber to fill said first chamber with a first product component and said second electrode is a filler nozzle to fill said second chamber with a second product component.

12. A method to determine the integrity of a tube package inner partitioning wall of a multichamber tube comprising:

a tube package open at a first end and having at least one elongated outer wall and at least one inner partitioning wall to form at least two chambers;

inserting a filling nozzle into each of said at least two chambers by relative motion of said filling nozzles and said tube package and filling each chamber with one of the same or different product component each of which is an electrolyte, an electrode being a part of each filling nozzle;

applying a potential difference to said electrode part of each filling nozzle while maintaining said electrode part in each product component in each of said at least two chambers; and measuring the potential difference and comparing said potential difference to a standard to thereby determine if there has been a change in potential difference to indicate that there are any voids extending substantially through said at least one inner partitioning wall.

13. A method as in claim 12 wherein said filling is at one location and said applying a potential difference is at another location.

14. A method as in claim 12 wherein if there is a change in said potential difference indicating one or more voids said tube package is conveyed to a reject chute.

15. A method as in claim 12 wherein said product components are dentifrices.

16. A method as in claim 12 wherein said potential difference of said electrode in a first chamber and said electrode in a second chamber is from about 0.5 volts to 5000 volts.

17. A method as in claim 12 wherein said inner partitioning wall has a thickness of about 10 microns to about 500 microns.

18. A method as in claim 12 wherein said at least one inner partitioning wall is comprised of one of a polyolefin polymer and a polyolefin copolymer and each is one of a monolayer and a multilayer structure.

19. A method as in claim 12 wherein said at least one inner partitioning wall is comprised of polyethylene terephthalate and is one of a monolayer and a multilayer structure.

20. A method as in claim 12 wherein said filling of said at least two chambers is by means of at least two filling nozzles, an electrode being a part of each filling nozzle whereby said electrode is inserted into said product component in each chamber as said chamber is being filled.

* * * * *